United States Patent [19]

Johansson et al.

[11] Patent Number: 4,571,324
[45] Date of Patent: Feb. 18, 1986

[54] NUCLEAR FUEL ASSEMBLY SPACER

[75] Inventors: Eric B. Johansson; Bruce Matzner, both of San Jose, Calif.

[73] Assignee: General Electric Company, San Jose, Calif.

[21] Appl. No.: 535,851

[22] Filed: Sep. 26, 1983

[51] Int. Cl.[4] .............................................. G21C 3/34
[52] U.S. Cl. .................................... 376/441; 376/438; 376/442
[58] Field of Search .................... 376/438, 441, 442

[56] References Cited

U.S. PATENT DOCUMENTS

| | | | |
|---|---|---|---|
| 3,298,922 | 1/1967 | Prince et al. | 376/441 |
| 3,301,765 | 1/1967 | Eyre et al. | 376/441 |
| 3,365,371 | 1/1968 | Lass et al. | 376/245 |
| 3,379,618 | 4/1968 | Frisch | 376/442 |
| 3,398,053 | 8/1968 | Huber et al. | 376/442 |
| 3,431,170 | 3/1969 | Lass et al. | 376/440 |
| 3,654,077 | 4/1972 | Lass et al. | 376/442 |
| 3,886,038 | 5/1975 | Raven | 376/442 |
| 4,389,369 | 6/1983 | Bryan | 376/438 |
| 4,435,357 | 3/1984 | Krieger | 376/442 |

OTHER PUBLICATIONS

El-Wakil, *Nuclear Power Engineering*, McGraw-Hill, Inc., 1962.

*Primary Examiner*—Harvey E. Behrend
*Assistant Examiner*—Richard W. Wendtland
*Attorney, Agent, or Firm*—Ivor J. James; Samuel E. Turner; Raymond G. Simkins

[57] ABSTRACT

In a fuel assembly for a nuclear reactor a fuel element spacer formed of an array of laterally positioned co-joined tubular ferrules each providing a passage for one of the fuel elements, the elements being laterally supported in the ferrules between laterally oriented spring members and oppositely positioned rigid stops, the wall thickness of the ferrules being relatively large and the height of the ferrules being relatively small to reduce hydride concentration in the ferrule material while maintaining relatively low flow resistance.

8 Claims, 7 Drawing Figures

NUCLEAR FUEL ASSEMBLY SPACER

BACKGROUND

Nuclear power reactors are well known and are discussed, for example, by M. M. El-Wakil in "Nuclear Power Engineering", McGraw-Hill Book Company, Inc., 1962.

In a known type of nuclear power reactor, for example, as used in the Dresden Nuclear Power Station near Chicago, Ill., the reactor core is of the heterogenous type. In such reactors the nuclear fuel comprises elongated rods formed of sealed cladding tubes of suitable material, such as a zirconium alloy, containing uranium oxide and/or plutonium oxide as the nuclear fuel, for example, as shown in U.S. Pat. No. 3,365,371. A number of such fuel rods are grouped together and contained in an open-ended tubular flow channel to form a separately removable fuel assembly or bundle as shown, for example, in U.S. Pat. No. 3,431,170. A sufficient number of fuel assemblies are arranged in a matrix, approximating a right circular cylinder, to form the nuclear reactor core capable of self-sustained fission reaction. The core is submerged in a fluid, such as light water, which serves both as a coolant and as a neutron moderator.

A typical fuel assembly is formed by an array of spaced fuel rods supported between upper and lower tie plates, the rods being several feet in length, on the order of one-half inch in diameter and spaced from one another by a fraction of an inch. To provide proper coolant flow past the fuel rods it is important to maintain the rods in spaced position and restrain them from bowing and vibrating during reactor operation. A plurality of fuel rod spacers spaced along the length of the fuel assembly are provided for this purpose.

Design considerations of such fuel rod spacers include the following: retention of rod-to-rod spacing; retention of fuel assembly shape; allowance for fuel rod thermal expansion; restriction of fuel rod vibration; ease of fuel bundle assembly; minimization of contact areas between the spacer and fuel rods; maintenance of structural integrity of the spacer under normal and abnormal (such as seismic) loads; minimization of reactor coolant flow distortion and restriction; maximization of thermal limits; minimization of parasitic neutron absorption; minimization of manufacturing costs including adaptation to automated production. Thus the need to provide such fuel rod spacers creates several significant problems.

Any material, in addition to the nuclear fuel, that must be used in the construction of the reactor core unproductively absorbs neutrons and thus reduces reactivity with the result that an additional compensating amount of fuel must be provided. The amount of such parasitic neutron absorption is a function of the amount of the non-fuel material, of its neutron absorption characteristics, that is, its neutron absorption cross section, and of the neutron flux density to which it is exposed.

To remove the heat from the nuclear fuel, pressurized coolant is forced through the fuel assemblies of the reactor core. The fuel rod spacers in the assemblies act as coolant flow restrictors and cause an undesirable though inevitable coolant flow pressure drop. To maintain proper cooling of the fuel rods along their length and to minimize the required coolant pumping power it is desirable that spacer coolant flow resistance be minimized. The flow resistance of a spacer is a strong function of its projected or "shadow" area. Therefore, the flow resistance of a spacer can be minimized by minimizing the projected area of the structure of the spacer. Tests have shown that spacers employing minimized projected area also have the highest thermal limits.

The coolant flow resistance of a spacer is also a strong function of the surface or "wetted" area of the spacer because of the fluid flow friction between the spacer surfaces and the coolant flowing therethrough. Therefore, the flow resistance of a spacer can be minimized by reducing the height of the spacer.

As a practical matter the desire to minimize both parasitic neutron absorption and coolant flow restriction presents a conflict in fuel rod spacer design.

To minimize coolant flow restrictions, spacer members should be thin and of minimal cross section area. However, very thin members must be formed of high strength material to provide suitable spacer strength. Also, high strength material with suitable resilience characteristics must be used for any spring member portions of the spacer. It is found that such suitable materials have relatively high neutron absorption characteristics.

On the other hand, materials of desirably low neutron absorption characteristics are found to be of relatively low strength, difficult to form and lacking the resiliency desired for the spring member portions of the spacer.

An approach toward the resolution of the foregoing design conflict is a "composite" spacer wherein the structural members are formed of a material having a low neutron absorption cross section and the spring members thereof are separately formed of suitably resilient material whereby the amount of high neutron absorption cross section material is minimized.

A variety of such fuel rod spacers have been proposed and used. An example is shown in U.S. Pat. No. 3,654,077. The spacer shown therein (especially the embodiment of FIGS. 5 and 6 thereof) has enjoyed long commercial success. In the spacer thereof the peripheral support member and the divider members are formed of low neutron cross section material such as a zirconium alloy. The divider members are skeletonized, i.e., formed with cutouts, to further reduce neutron loss. To minimize the amount of high neutron cross section spring material in the spacer, a single spring member projects into each of the fuel rod passages, the springs being in the form of four-sided assemblies.

Another example of a spacer design is shown in U.S. Pat. No. 3,886,038.

A further example of a spacer design is a spacer of the ferrule type (a spacer formed of an array of cojoined tubular ferrules) as shown by Matzner et al in U.S. patent application Ser. No. 410,124, filed Aug. 20, 1982, now U.S. Pat. No. 4,508,679 issued April 2, 1985, assigned to the same assignee herein, which application is hereby incorporated by reference herein.

In the past, fuel assemblies were designed for a residence time in the core of in the order of four years. Recent trends toward longer fuel burnup require fuel assembly residence times in the order of six years or more.

This increased residence time in the core gives rise to a further spacer design problem, namely, an increase in the amount of hydrogen picked up by the spacer from the environment of the core to the extent that the hydride concentration in the material of the spacer can cause embrittlement thereof and consequent decrease in its strength. If the hydride concentration becomes too high, there is a possibility of spacer failure.

The amount of hydrogen picked up by the spacer is proportional to the spacer surface area which is exposed to the coolant, i.e., the "wetted" surface area. The rate of hydrogen diffusion into the relatively thin spacer members is sufficient to give a substantially uniform hydride concentration throughout the volume of the spacer material. Therefore, the hydride concentration is proportional to the ratio of the wetted surface area to the volume of the spacer material.

Thus the hydride concentration can be reduced by increasing the cross section area of the spacer members by an increase in their width or thickness.

As discussed hereinbefore, coolant flow resistance through a spacer is a function of both cross section area and height of the spacer members, therefore, to maintain a desirably low coolant flow resistance, any increase in thickness of the spacer members must be compensated for by a decrease in the height of the spacer members.

Thus, for minimizing hydride concentration, a spacer of minimum height is indicated.

In many spacer designs the minimum height is limited by the design of the spacer springs. In spacers where the springs are vertically (axially) oriented, such as shown in the above-mentioned patent application Ser. No. 410,124, minimum height of the spacer is dictated by the spring length needed for the required spring flexibility and force.

An object of the invention is a nuclear fuel element spacer with spacer members having sufficient cross section area to maintain hydride concentrations therein at suitable levels over extended residence time of the spacer in a nuclear reactor core.

Another object is to minimize the height of a spacer to minimize the resistance to coolant flow therethrough.

Another object is a laterally or horizontally oriented spring member for a spacer so that the required spring length does not dictate the minimum height of the spacer.

Another object is a lateral spacer spring which spans two adjacent fuel element passages for lateral support of the elements extending through the passages.

Another object is a lateral spacer spring which is retained by horizontal slots in the spacer members whereby a substantial portion of the spring is within the "shadow" of the spacer members so that the contribution of the spring to coolant flow resistance is minimized.

Another object is a lateral spacer spring wherein the stress distribution is such as to make efficient use of the spring material whereby the amount of spring material in the spacer is minimized.

Another object is a spacer formed of an array of cojoined ferrules wherein the ferrules have outer surfaces of octagonal shape and inner surfaces of circular shape.

SUMMARY

These and other objects of the invention are achieved by a spacer formed of an array of cojoined tubular ferrules, each ferrule providing a passage or cell for a fuel rod or other elongated element of the fuel assembly. A peripheral band can be provided.

The welded-together ferrules provide a structure of high structural strength whereby the thickness of the metal used to form the ferrules (and peripheral band) can be minimized to reduce coolant flow resistance and parasitic neutron absorption.

Neutron absorption is further decreased by forming the ferrules and support band of low neutron cross section material.

The rods or elements extending through the ferrules are centered and laterally supported therein between rigid stops and resilient members. The rigid projections may take the form of arched portions of the walls of the ferrules.

To limit the hydride concentration in the spacer material, resulting from continued hydrogen pickup during long residence time of the spacer in the core, the ratio of the surface area to the cross section area of the spacer members is reduced by increasing the thickness of the spacer members as compared to the members of a spacer designed for a shorter residence time. To offset the increase in coolant flow resistance that would result from only increasing the thickness of the spacer members, the height of the spacer members is reduced. The reduced vertical height limits the length available for resilient members or spacer springs.

Therefore, in accordance with the invention the resilient members or spacer springs take the form of laterally or horizontally oriented shaped leaf springs which span two adjacent ferrules of the spacer to engage and laterally support the two fuel rods or other elements extending through these ferrules.

The spacer springs are configured to provide a stress distribution therein which makes efficient use of the spring material whereby the amount of spring material in the spacer is minimized.

The horizontal spacer springs are retained in cutouts in the two adjacent ferrules. A substantial portion of each spring is within the cross section or shadow of the ferrule walls whereby this portion does not add to coolant flow resistance. Since the horizontal spacer springs are edgewise with respect to coolant flow, their contribution to total spacer cross section or projected area is minimized to thus minimize their contribution to coolant flow resistance.

The spacer springs are formed with dimples at their contact points with the fuel rods or other elements to minimize the contact area therewith.

While the inner and outer surfaces of the ferrules of the spacer may have circular, octagonal or other shapes, in a preferred embodiment the inner surface is of circular shape while the outer surface is of octagonal shape.

As compared to a ferrule of the same minimum wall thickness but with circular inner and outer surfaces, the extra material of a ferrule with an octagonal outer surface provides a large increase in the strength and stiffness of the spacer. Furthermore, this extra material is in regions of relatively low coolant flow (along the surfaces of the ferrule outer walls) whereby the contribution of the extra material to coolant flow resistance is minimized.

Use of ferrules of octagonal outer surface shape also reduces the total surface area of the spacer exposed to the coolant because of the relatively large contact surface area between adjacent such ferrules. This aids in minimizing the hydrogen pickup by the spacer material.

DRAWING

DESCRIPTION

Figure 1:
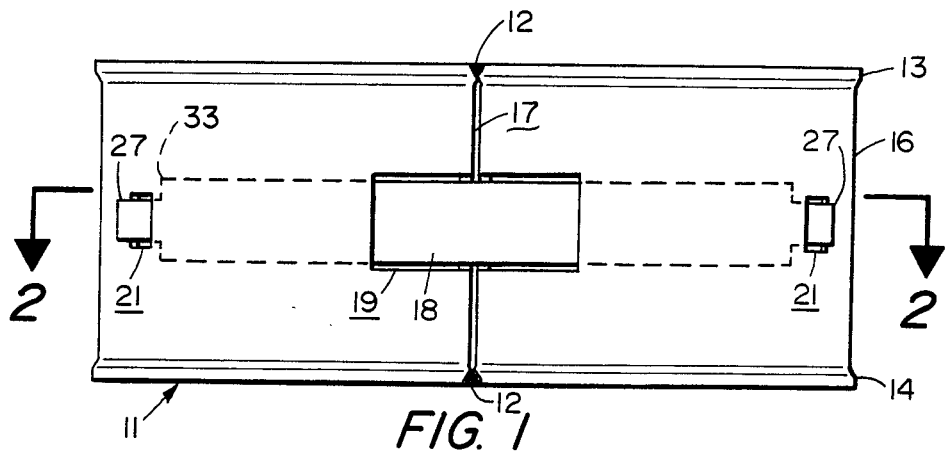
FIG. 1 is an elevation view of a pair of adjacent ferrules of a spacer according to the invention with the spring member of the invention mounted therein.
Figure 2:
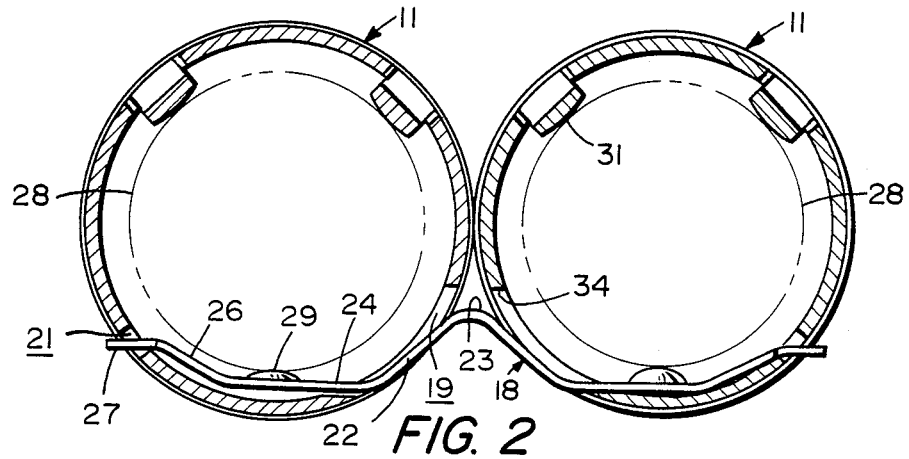
FIG. 2 is a cross section view of the spacer ferrule arrangement of FIG. 1.

A pair of adjacent and abutting ferrules 11 are shown in FIGS. 1 and 2, the abutting walls of which are joined together as by welds 12 at their top and bottom ends.

Any selected number of ferrules 11 may be arranged in abutting relation and cojoined to form a spacer (including a peripheral band if desired) providing the required number of fuel rod passages as shown and described in greater detail in the above referenced patent application Ser. No. 410,124.

As illustrated in FIGS. 1 and 2, the upper and lower end portions 13 and 14 of the ferrules 11 are of greater outside diameter than the major body portions 16. This provides a small space or gap 17 between the adjacent ferrules 11 which allows some coolant circulation to discourage crud buildup and possible crevice corrosion between the ferrules. An alternative to providing the gap 17 is the use of ferrules of uniform outside diameter welded or brazed together along their entire length (height).

To limit the hydride concentration in the ferrules 11, the ratio of the surface area to the cross section area thereof is reduced by an increase in their wall thickness. To prevent the increased coolant flow resistance that would otherwise result from the increased thickness, the height of the ferrules is reduced.

Figure 3:
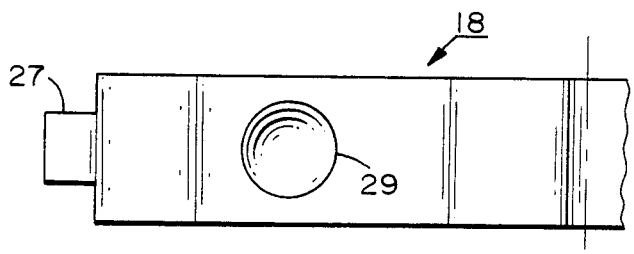
FIG. 3 is a elevation view of one arm of the spring member of the invention.
Figure 4:
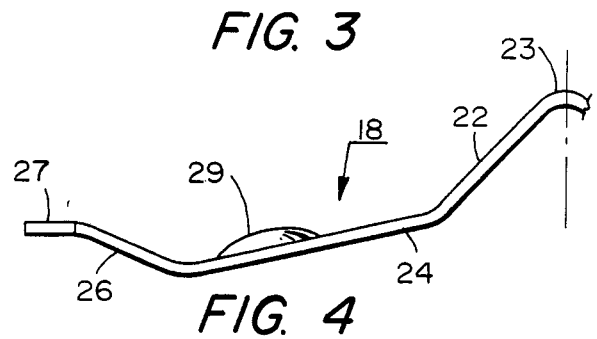
FIG. 4 is a plan view of the arm of the spring member of FIG. 3.

To provide the desired spring characteristics in a spacer of limited height, a horizontally oriented spring member 18 fitted in cutouts 19 and 21 of the ferrules 11 is shown in FIGS. 1 and 2. The spring member 18 is also shown separately in its unstressed form, in the side and top views of FIGS. 3 and 4. Since the spring member 18 is symmetrical left and right from its center, only the left arm thereof is shown in FIGS. 3 and 4.

The spring member 18 includes a relatively large V-shaped central portion 22 having an apex 23 extending inward between the adjacent ferrules 11. (The function of the V-shaped central portion will be discussed hereinafter.) Each arm of the spring member 18, outward from the central portion 22 includes a long center portion 24, a shorter end portion 26 angled toward the ferrules 11 and a tip portion or tab 27 of reduced height.

At the position of contact of the spring member 18 with a fuel rod or other element 28 (shown by dashed lines in FIG. 2) extending through the ferrules 11, the center portion 24 of the spring member 18 is formed with a protrusion or dimple 29 to limit the contact area between the element 28 and the spring member 18.

To center and laterally support the element 28 in the ferrules 11, a pair of radially spaced, inwardly projecting relatively rigid stops 31 are provided in each ferrule 11 generally opposite the contacting dimple 29 of the spring member 18.

Figure 5:
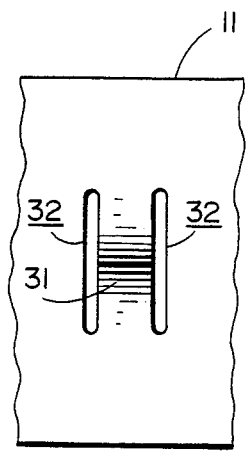
FIG. 5 is a partly cutaway elevation view of a ferrule of the invention illustrating a rigid stop found therein.

The stops 31 are preferably formed integrally in the walls of the ferrules. As illustrated in FIG. 5 this can be accomplished by first forming a pair of spaced slits 32, defining the desired length and width of the stop 31, in the wall of the ferrule 11. The material between the slits 32 is then deformed inwardly to form the curved stop 31.

To form the assembly of the two adjacent ferrules 11 and the spring member 18, one arm of the spring member 18 is placed in the cutouts 19 and 21 of a first one of the ferrules 11 with the tab 27 projecting through the cutout 21. (Shoulders 33 formed at the outer end of the end portion 26 of the spring member 18 engage the inner side of the cutout 21 to laterally locate and retain the spring member 18.) The other arm of the spring member 18 is then inserted in the cutouts 19 and 21 of the second one of the ferrules 11 as it is moved toward the first one of the ferrules. Then the ferrules 11, in aligned and abutting relation are welded together by welds 12 (FIG. 1).

The function of the relatively large V-shaped central portion 22 of the spring member 18 will now be discussed. To provide the desired spring force against the elements 28 where they are inserted through the ferrules 11 the unstressed contour of the spring 18 (FIG. 4) is such that, in the absence of a preload, the spring member 18 would project into the ferrules 11 to such an extent that insertion of the elements 28 therethrough could be difficult if not impossible. Also end tabs 27 of excessive length would be required, to retain the spring 18 in position.

Such problems are solved, in accordance with the invention, by the V-shaped central portion 22. In the absence of elements 28 extending through the ferrules 11, the apex 23 of the portion 22 contacts the inner vertical edges 34 of the cutouts 19 (FIG. 2) to preload the spring member 18 and thus limit the extent of the protrusion into the ferrules 11.

Among the advantages of the shape of the spring member 18 is its efficient use of spring material. Between the contact points presented by the dimples 29 the spring member is uniformly stressed since the bending moment is constant over this span. Between the dimples 29 and the outer end of each arm where contact is made with the cutouts 21, the bending moment drops linearly to zero. This stress distribution gives very efficient use of material since most of the spring material contributes to the maximum extent to spring member flexibility. Minimization of the amount of spring material is important because of the relatively high neutron capture cross section of such material.

Another advantage of the present spring arrangement is that a substantial portion of the spring member is within the shadow or cross section area of the walls of the ferrules 11. This aids in achieving a low resistance to coolant flow through the spacer.

EXAMPLE

In an example embodiment of the invention the ferrules 11 are about 0.600 inches (1.52 cm) high, about 0.64 inches (16.2 cm) in outside diameter with a wall thickness of about 0.030 inches (0.76 mm). The ferrules 11 are preferably formed of a material of low neutron absorption cross section such as a zirconium alloy, for example, Zircaloy-4.

The spring member 18 is formed of a material having suitable strength, corrosion resistance and resilience characteristics such as a nickel alloy, for example, Inconel. An example spring member 18 is about 1.13 inches (2.87 cm) in overall formed length with a height of about 0.15 inches (0.38 mm) and a thickness of about 0.014 inches (0.036 mm).

As compared to the ferrule spacer shown in the aforementioned patent application Ser. No. 410,124, a spacer formed according to the present invention provides a reduction in the ratio of the wetted surface area to the volume of ferrule material and hence a reduction in the hydride concentration for given residence time in the reactor core of about 33 percent.

ALTERNATE EMBODIMENT

Figure 6:
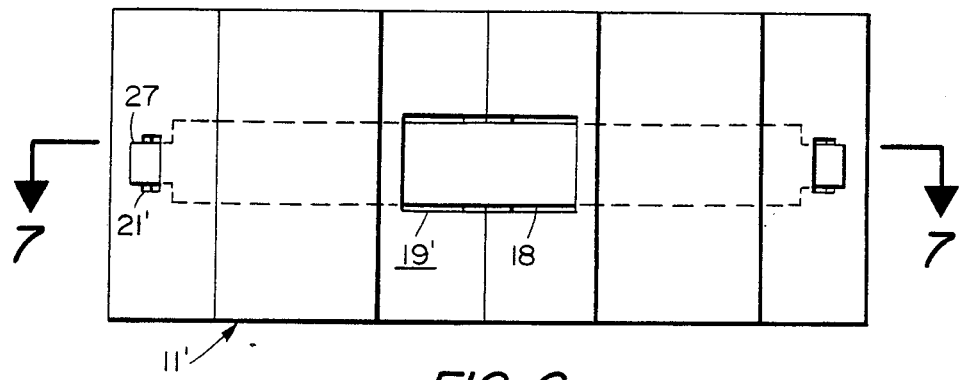
FIG. 6 is an elevation view of a pair of adjacent ferrules of a spacer according to the invention wherein the ferrules have an octagonal outer shape.
Figure 7:
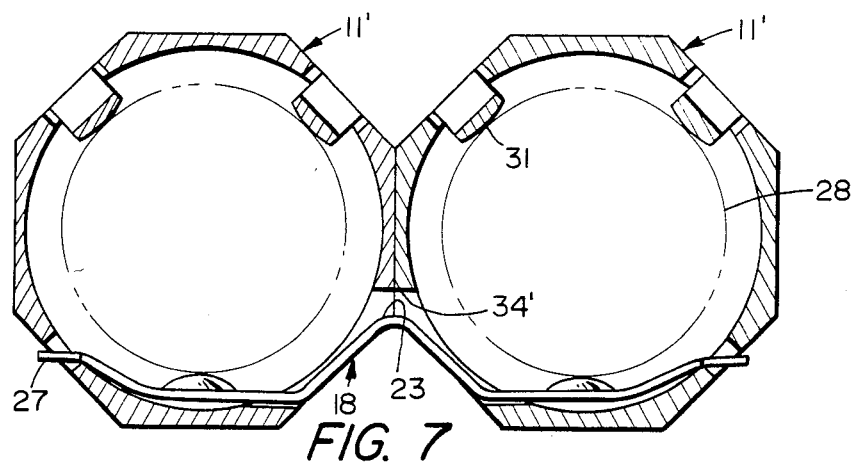
FIG. 7 is a cross section view of the spacer ferrule arrangement of FIG. 6.

In an alternate embodiment illustrated in FIGS. 6 and 7, the inner surfaces of adjacent ferrules 11' are of circular shape while the outer surfaces are of octagonal shape. The spring member 18 and the rigid stops 31 may be as described hereinbefore.

The advantages of the octagonal outer shape are several. The added material of the ferrules 11' contributes less to flow resistance than the same volume of material in ferrules of circular outer shape because the added material of the octagonal outer shape does not require a decrease in the inside diameter of the ferrule where addition of material has a more detrimental effect on coolant flow resistance.

With ferrules 11' of octagonal outer shape a greater amount of the spring member 18 is within the shadow area of the ferrule walls which contributes to lower coolant flow resistance.

Because of the large area of the abutting octagonal sides of an array of the ferrules 11', wetted surface area is reduced and a spacer formed thereof is strong and rigid. While the large abutting areas provide these advantages, it is important that the joining of adjacent ferrules 11' be done in a manner to seal the abutting areas from intrusion of coolant to prevent possible crevice corrosion. This can be done by welding all around or preferably by joining the entire abutting areas together by brazing.

In an example of the embodiment of FIGS. 6 and 7, the ferrules 11' are about 0.600 inches (1.52 cm) high with an inside diameter of about 0.600 inches (15.2 mm).

As compared to a spacer formed of ferrules of circular inner and outer shapes of the same height, same center-to-center spacing and same volume of ferrule material, a spacer formed of the ferrules 11' provides a reduction in hydride concentration of about 48 percent for given core residence time.

What is claimed is:

1. In a fuel assembly for a nuclear reactor including a plurality of elongated elements, a spacer for retaining said elements in lateral position comprising: an array of laterally positioned, cojoined tubular ferrules, each of said ferrules providing a passage for one of said elements; laterally oriented leaf spring members, each of said spring members spanning two adjacent ones of said ferrules and extending therein to engage and laterally support the elements extending through said adjacent ferrules, facing sides of said adjacent ferrules being formed with cutouts to receive and support the spring member, the sides of said ferrules opposite said facing sides being formed with openings to receive and restrain the ends of said spring member, said spring member being formed with a generally V-shaped central portion with an apex extending toward the adjacent sides of said adjacent ferrules whereby in the absence of elements through said adjacent ferrules said central portion contacts said adjacent sides to provide a preload on said spring member and limit the amount of projection of said spring member into said ferrules whereby the insertion of said elements through said ferrules is facilitated, said central portion of said spring member being unrestrained in the presence of said elements through said ferrules, said spring member having left and right arms extending outward from said V-shaped central portion, each of said arms including a relatively long center portion for contacting a respective one of said elements, a shorter end portion angled toward said ferrules and a tab of reduced height at the end of each arm engaging a respective one of said openings whereby the resulting shoulders at the ends of said spring member engage the inner surface of said ferrules adjacent said openings to laterally locate and retain said spring member.

2. The spacer of claim 1 wherein the portions of said spring member which contact the elements extending through said adjacent ferrules are formed with dimples to limit the area of contact between said spring member and said elements.

3. The spacer of claim 1 wherein the outside surfaces of said ferrules are octagonal in shape and the inside surfaces of said ferrules are circular in shape.

4. The spacer of claim 1 wherein the height of said ferrules is less than the inside diameter of said ferrules.

5. The spacer of claim 1 wherein the ratio of the exposed surface area of the ferrules to their volume is between about 50 and about 70 ($cm^2/cm^3$).

6. The spacer of claim 1 wherein at least two laterally spaced relatively rigid stops project into each of said ferrules generally opposite the spring member projecting into the ferrule whereby the element extending through said ferrule is laterally supported therein between a spring member and at least two rigid stops.

7. The spacer of claim 1 wherein said rigid stops are integrally formed in said ferrules by first forming a pair of spaced slits in the wall of the ferrule and then deforming the portion between the slits inward to form the rigid stop.

8. The spacer of claim 1 wherein said adjacent ferrules are formed with upper and lower end portions of greater outside diameter than the major body portions of said ferrules whereby a gap is provided between said adjacent ferrules for coolant circulation.

* * * * *